Figure 1:
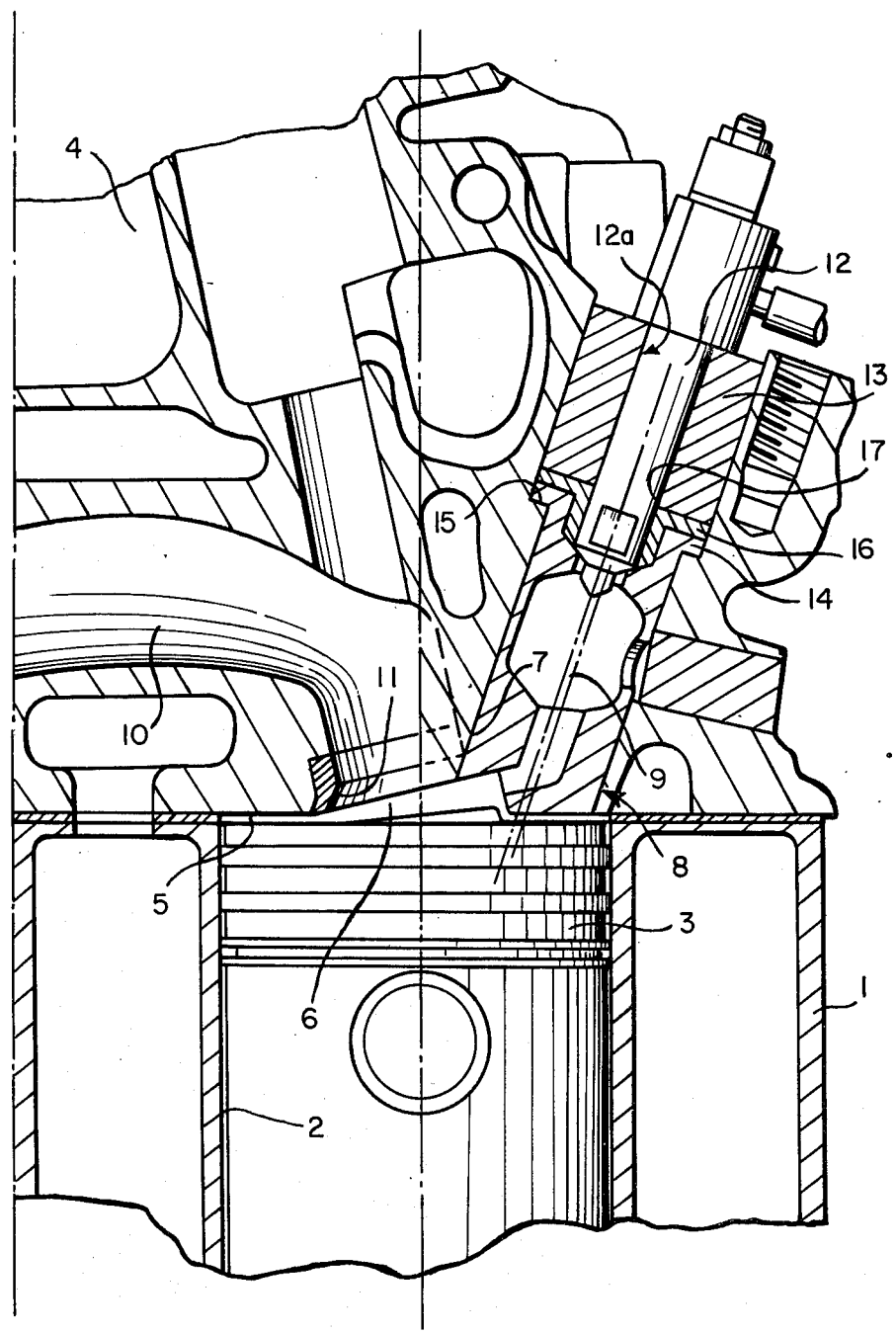

United States Patent [19]

Burgio

[11] 4,433,659
[45] Feb. 28, 1984

[54] PRECOMBUSTION CHAMBER FOR INTERNAL COMBUSTION ENGINES WITH COMPRESSION-IGNITION

[75] Inventor: Antonio Burgio, Moncalieri, Italy

[73] Assignee: Fiat Auto S.p.A., Turin, Italy

[21] Appl. No.: 58,397

[22] Filed: Jul. 17, 1979

[30] Foreign Application Priority Data

Jul. 26, 1978 [IT] Italy .............. 53584/78[U]

[51] Int. Cl.³ ............................. F02B 19/10
[52] U.S. Cl. .................... 123/256; 123/275; 123/283
[58] Field of Search ............... 123/32 C, 32 D, 32 K, 123/32 ST, 32 SP, 32 R, 191 S, 193 H, 193 CH

[56] References Cited

U.S. PATENT DOCUMENTS 3,220,389  11/1965  Rinsum et al. ............ 123/32 S
3,890,940   6/1975  List .................................. 123/191 S

FOREIGN PATENT DOCUMENTS 2522585  12/1976  Fed. Rep. of Germany ... 123/191 S
2624189  12/1977  Fed. Rep. of Germany .... 123/32 C
2836528   3/1979  Fed. Rep. of Germany .... 123/32 C
 854483   4/1940  France ........................... 123/32 C
 322424   7/1957  Switzerland .................... 123/32 D
 406402   3/1934  United Kingdom .............. 123/32 C Primary Examiner—Parshotam S. Lall
Attorney, Agent, or Firm—Sughrue, Mion, Zinn, Macpeak and Seas

[57] ABSTRACT

A precombustion chamber for a compression-ignition internal combustion engine is formed in a cylindrical metal insert seated in the cylinder head. The internal cavity of the insert has a central cylindrical part which at its end adjacent the combustion chamber is connected through a frusto-conical part to a cylindrical second part of reduced diameter, the axis of which is displaced relative to the axis of the central cylindrical part in the opposite direction to an end part which communicates with the combustion chamber. A fuel injector is inserted into an upper end part of the insert, coaxial with the central cylindrical part of the cavity. The configuration leads to a reduction in exhaust smoke.

3 Claims, 2 Drawing Figures

PRECOMBUSTION CHAMBER FOR INTERNAL COMBUSTION ENGINES WITH COMPRESSION-IGNITION

The present invention relates to internal combustion engines with compression-ignition.

More particularly, the invention concerns compression-ignition internal combustion engines of the type comprising:

at least one piston and cylinder;

a cylinder head having a wall facing said cylinder, a combustion chamber inside said cylinder, delimited at one end by the said wall and at the other end by the piston, a tubular cylindrical metal insert mounted in a seating in said wall of the cylinder head and having an internal cavity which forms a precombustion chamber, said internal cavity having a central cylindrical part, the end of which adjacent the combustion chamber is connected by means of a frusto-conical part with a cylindrical second part of reduced diameter having an axis parallel to the axis of said central part, a first end part, the axis of which is inclined to the axis of said cylindrical second part of reduced diameter, affording communication between the latter part and the combustion chamber, and a second end part coaxial with said central cylindrical part at the end of said cavity opposite the combustion chamber, said second end part being shaped so as to form a seat for a fuel injector for the injection of fuel into said precombustion chamber.

An internal combustion engine of the aforesaid type, herein referred to as "the type specified", is described and illustrated in German published Patent Application DOS 28 36 528, filed on Aug. 21, 1978 and published on Mar. 29, 1979, and in the corresponding U.S. patent application Ser. No. 930,120 filed on the Aug. 1, 1978, now abandoned. The engine described in the aforesaid patent applications is a fast diesel engine particularly for motor vehicles of small or medium cylinder capacity (swept volume). The particular configuration of the precombustion chamber in such an engine affords a considerable reduction in the extent of some of the disadvantageous phenomena associated with fast diesel engines, notably a tendency towards incomplete combustion and excessive rapidity of combustion which give rise to black smoke in the engine exhaust and to excessive roughness in the running of the engine.

Research and experiments carried out by the Applicants on the engine to which the above cited patent applications relate have shown that the aforesaid phenomena, although possibly reduced to some extent, continue to be evident under conditions of variable engine load, particularly under acceleration.

The object of the present invention is to provide an internal combustion engine of the type specified having a precombustion chamber with a structure and configuration such as substantially to eliminate the aforesaid phenomena under all engine load conditions.

Accordingly the present invention provides an internal combustion engine of the type specified, characterised in that the axis of the said cylindrical second part of reduced diameter is displaced with respect to the axis of the said central cylindrical part in the opposite direction to the said first end part.

Experiments conducted by the Applicants have shown that, thanks to the aforesaid characteristic, the previously mentioned disadvantageous phenomena have been substantially eliminated, probably as a result of the misalignment between the axis of the cylindrical part of reduced diameter and the axis of the central cylindrical part: this misalignment renders the passage of the flame front filaments from the precombustion chamber to the combustion chamber more difficult, leading to the advantages of a reduction in the roughness of running of the engine and more complete combustion of fuel. This in turn results in greater engine silence, less exhaust smoke and higher values of the specific engine power (that is, the power per liter of fuel).

In a preferred embodiment of the present invention, in which the said second cylindrical part of reduced diameter has a diameter substantially equal to 40% of the diameter of the said central cylindrical part, the distance between the axis of the central cylindrical part and the axis of the said second cylindrical part of reduced diameter is between 2.5% and 7.5% of the diameter of the central cylindrical part.

In the case where the said central cylindrical part is delimited by a wall having a radial hole designed to afford a seat for a preheating glow plug compatible with the said precombustion chamber, the internal combustion engine according to the present invention is preferably characterised in that the axis of the said radial hole is inclined to a radial plane perpendicular to the axis of the central cylindrical part in the direction of the second end part. In consequence, the preheating glow plug, when fitted, has the same inclination to said plane.

Preferably the said inclination of the axis of said radial hole to said radial plane is substantially equal to 5°.

Practical experiments carried out by the Applicants have shown that the aforesaid characteristics lead to a reduction in the exhaust smoke of the engine.

Figure 2:
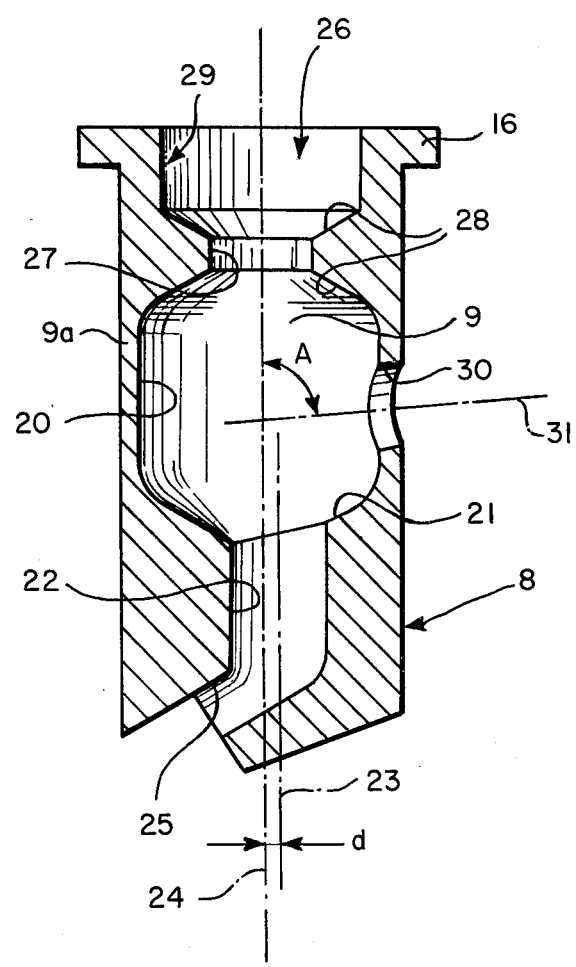

The invention will be further described, by way of non-limiting example, with reference to the accompanying drawings, in which:

FIG. 1 is a transverse cross section of part of a compression-ignition internal combustion engine according to the present invention taken on the axis of one of the cylinders of the engine, and FIG. 2 is a view on an enlarged scale of a precombustion chamber insert of the engine shown in FIG. 1.

FIG. 1 shows an engine cylinder block 1 having a cylinder 2 in which a piston 3 is mounted for sliding movement. The cylinder block 1 is surmounted by a cylinder head 4 which has a wall 5 facing the cylinder 2.

A combustion chamber 6 is arranged in correspondence with the cylinder 2 and is delimited on one side by the wall 5 of the cylinder head 4 and on the other side by the piston 3.

A bore 7 is formed in the wall 5 of the cylinder head 4, the axis of the bore 7 being inclined to the axis of the cylinder 2. In the example illustrated in FIG. 1, the axis of the bore 7 is inclined to the axis of the cylinder 2 at an angle of about 20°. A tubular metal insert 8, substantially cylindrical in shape, is mounted in the bore 7. The internal cavity of the insert forms a precombustion chamber 9 communicating at one end with the combustion chamber 6.

Also formed in the cylinder head 4 are an inlet and an exhaust duct 10 (one only of which is visible in FIG. 1) communicating with the cylinder 2, each duct 10 including a seat 11 for an associated valve (not shown).

A fuel injector 12 is associated with the precombustion chamber 9 and located within the bore 12a of a tubular spacer element 13 inserted in the bore 7 above the metal insert 8. The insert 8 has, at its end adjacent the spacer element 13, an annular flange 14 which abuts an annular shoulder 15 in the bore 7. Between the annular flange 14 of the insert 8 and the spacer element 13 there is interposed a further spacer element 16 having a central through bore which receives the tip of the injector 12.

With reference to FIG. 2 the internal cavity of the hollow cylindrical insert 8 has a central cylindrical part 20 of which the end which, in the fitted state of the insert, is adjacent the combustion chamber 6 communicates through a frusto-conical part 21 with a cylindrical second part 22 of reduced diameter, the axis 23 of the second part 22 being parallel to and spaced from the axis 24 of the central cylindrical part 20.

The internal cavity of the metal insert 8 also has a first end part 25, the axis of which is inclined at approximately 120° to the axis 23 of the second cylindrical part 22, which communicates with the combustion chamber 6. At the end opposite the first end part 25, the internal cavity of the metal insert 8 has a second end part 26 which is adapted to receive the tip of the fuel injector 12. The end part 26 has a cylindrical throat 27 adjoining the central cylindrical part 20 and a cylindrical end bore 29 by way of frusto-conical surfaces 28. The end core 29 opens out into the end of the metal insert 8 which is provided with the annular flange 16.

In the illustrated example the diameter of the cylindrical second part 22 of reduced diameter is substantially 40% of the diameter of the central cylindrical part 20.

The main characteristic of the internal combustion engine illustrated lies in the fact that the axis 23 of the second cylindrical part 22 is displaced with respect to axis 24 of the central part 20 in the opposite direction to the first end part 25. In this example the distance d between the two axes 23, 24 is substantially equal to 6% of the diameter of the central cylindrical part 20. In general, the distance d may be between 2.5% and 7.5% of the diameter of the central cylindrical part 20.

Reference numeral 9a indicates the wall of the metal insert 8 which delimits the central cylindrical part 20. The wall 9a is formed with a radial hole 30 which is designed to act as a seat for a preheating glow plug of known type (not shown) compatible with precombustion chamber 9. The internal combustion engine according to the invention illustrated in FIG. 1 is not provided with a preheating glow plug. Nevertheless the metal insert 8 is made with the radial hole 30 so as to allow for the possible use of a preheating glow plug.

A further characteristic of the engine illustrated in the drawings lies in the fact that the axis of the radial hole 30 is not perpendicular to axis 24 of the central cylindrical part 20 but is inclined to a radial plane perpendicular to axis 24 in the direction of the second end part 26 at an angle substantially equal to 5°. In other words the axis 31 intersects the axis 23 forming an angle A substantially equal to 85° with the portion of the axis 23 which passes through the second end part 26. If, therefore, a preheating glow plug is fitted, it assumes the same inclination as the axis 31, enabling the above quoted advantages to be obtained.

The applicants have carried out experiments on two engines of the type illustrated in the preceding description which were identical with each other except insofar as one of the engines had the axes 23, 24 aligned with the other. Each of the two engines had four vertical in line cylinders having an overall swept volume of 1360.50 cm$^3$. The diameter and the stroke of each piston were equal to 76 mm and 72 mm respectively and the compression ratio of each engine was equal to 22. The following table gives the values of the maximum specific power of the two engines, taken at two different speeds of rotation.

|  | Rotational speed r.p.m. | Maximum specific power HP/liter |
|---|---|---|
| Engine A | 5000 | 37.5 |
| (axes 23, 24 aligned) | 4250 | 37 |
| Engine B | 5000 | 38.3 |
| (axes 23, 24 spaced apart) | 4250 | 38 |

In engine B given in the above table the distance d between the axes 23 and 24 was equal to 2 mm. It has been found in practice that the distance d may vary between 1 mm and 3 mm without substantially affecting the advantages deriving from the invention.

It will be appreciated that details of construction of embodiments of the invention may be varied widely with respect to what has been described and illustrated purely by way of example, without departing from the scope of the present invention.

I claim:

1. In an internal combustion engine with compression-ignition of the type having:

at least one cylinder with a piston slidable therein;

a cylinder head having a wall facing said cylinder;

a combustion chamber within said cylinder delimited at one end by the said wall of the cylinder head and at the other end by the piston;

a fuel injector associated with said cylinder;

a seat in said wall of the cylinder head;

a substantially cylindrical tubular metal body mounted in said seat and having an internal cavity which forms a precombustion chamber communicating with the said combustion chamber, said internal cavity having a central cylindrical part, the end of which adjacent the combustion chamber is connected by means of a frusto-conical part with the cylindrical second part of reduced diameter having an axis parallel to the axis of said central part, a first end part, the axis of which is inclined to the axis of said cylindrical second part of reduced diameter, affording communication between the said second part and the combustion chamber, and a second end part coaxial with the said central cylindrical part at the end of said cavity opposite the combustion chamber, said second end part defining a seat for said fuel injector for the injection of fuel into said precombustion chamber, the improvements comprising the axis of the said cylindrical second part of reduced diameter being displaced with respect to the axis of the said central cylindrical part in the opposite direction to the inclination of said first end part, and said central cylindrical part being delimited by a wall having a radial hole defining a seat for a preheating glow plug compatible with said precombustion chamber with the axis of said radial hole being inclined at an angle substantially equal to 5° relative to a radial plane perpendicular to the axis of said central cylindrical part in the direction of the second end part.

2. The internal combustion engine defined in claim 1, wherein the diameter of said cylindrical part of reduced diameter is substantially equal to 40% of the diameter of the said central cylindrical part, and wherein the distance between the axis of the cylindrical second part of reduced diameter and the axis of the central cylindrical part is between 2.5% and 7.5% of the diameter of the central cylindrical part.

3. The internal combustion engine defined in claim 1, wherein the said second end part has a cylindrical throat, two frusto-conical surfaces bounding opposite sides of said throat, said throat adjoining through one said frusto-conical surface said central cylindrical part, and a cylindrical end bore opening out into one end of the tubular metal insert.

* * * * *